United States Patent [19]

Döring

[11] Patent Number: 4,740,945

[45] Date of Patent: Apr. 26, 1988

[54] SOUND REPRODUCING APPARATUS FOR NON-ROTATING PLATE-SHAPED OR SHEET-LIKE SOUND CARRIERS

[76] Inventor: Erich Döring, Im Hölzli, 9442 Berneck, Switzerland

[21] Appl. No.: 823,584

[22] Filed: Jan. 29, 1986

[30] Foreign Application Priority Data

Feb. 1, 1985 [EP] European Pat. Off. ........ 85101059.5

[51] Int. Cl.[4] .......................... G11B 3/40; G11B 17/00
[52] U.S. Cl. ......................................... 369/65; 369/67; 369/177
[58] Field of Search ....................... 369/63, 65, 66, 67, 369/177, 41

[56] References Cited

U.S. PATENT DOCUMENTS

| | | | |
|---|---|---|---|
| 3,193,295 | 7/1965 | Isemura | 274/9 |
| 3,224,782 | 12/1965 | Isemura | 274/14 |
| 3,282,590 | 11/1966 | Ashmaele et al. | 369/65 |
| 3,468,546 | 9/1969 | Duncan et al. | 369/65 |
| 3,636,655 | 1/1972 | Porter et al. | 369/65 |
| 3,702,032 | 11/1972 | Doring | 35/8 A |
| 3,883,146 | 5/1975 | Johnson et al. | 274/9 C |
| 4,574,370 | 3/1986 | Koike | 369/67 |

FOREIGN PATENT DOCUMENTS 1136505 9/1962 Fed. Rep. of Germany .
404230 6/1966 Switzerland .
706868 12/1979 U.S.S.R. ................. 369/65

Primary Examiner—Steven L. Stephan
Attorney, Agent, or Firm—Webb, Burden, Robinson & Webb

[57] ABSTRACT

In a sound reproducing apparatus for non-rotating plate-shaped or sheet-like sound carriers a pickup comprising a tone arm and a pickup system, is supported to swivel in horizontal and vertical directions on a rotating vertical-axis tone arm table operable by a battery backed driving motor. In order to enable predetermined portions of the spiral-shaped sound groove of the sound carrier to be approached, an abutment cam is provided which is capable of being swivelled into the area of movement of the pickup and engaged therewith. Through a setting knob, adjustable from an outer surface of the housing of said sound reproducing apparatus, said abutment cam can be moved into different radial positions, with respect to the tone arm table axis. When the tone arm table is rotating, the revolving pickup, especially said pickup system, first moves into contact with an engaging edge and is thereby urged toward the tip thereof over which it then slidingly passes, when reaching the desired portion of said sound groove, to scan then the remaining portion thereof.

6 Claims, 1 Drawing Sheet

4,740,945

SOUND REPRODUCING APPARATUS FOR NON-ROTATING PLATE-SHAPED OR SHEET-LIKE SOUND CARRIERS

BACKGROUND OF THE INVENTION

The present invention relates to an electrically driven hand-held playback device for non-rotating plate-shaped or sheet-like small sound carriers having a sound recording area in the form of a spiral sound groove and of a diameter of approximately 1 to 2.5 inches, as well as with aligning means for putting it into place in correct positional relationship, and refers also to such a sound carrier. For teaching purposes, and more particularly for self-tutoring, it is often desirable or even necessary to have pictorial representations or text written in a foreign language be supplemented by acoustic information, or printed text in a foreign idiom be pronounced for the student, so as to make deepened knowledge easier to acquire or teach the correct pronounciation. It is known, for this purpose, to use non-rotating sound carriers having a spiral sound groove, which are played using a detachable small sound reproducing apparatus, said apparatus including a revolving pickup for playing back the sound carrier sound groove. This type of sound carrier may be fast with the pages of a book. Such attaching to the book is conveniently done already during the stages of production of the book, unless it is left to be done by the buyer of the book who will then procure himself said sound carriers separately. Such a sound carrier may, for example, be of circular shape or be squared with a rounded-off top part (U.S. Pat. No. 3,702,032). However, it can also be provided on the quaternia of pages made out of foils of plastic material and intended to be inserted into books (U.S. Pat. No. 4,425,098).

Various embodiments are known of sound reproducing apparatuses, of the kind initially referred to, for such non-rotating plate-shaped or sheet-like sound carriers of a diameter of between 4 and 6 centimeters (German patent Nos. 1 301 150 and 21 55 910, U.S. Pat. Nos. 3,193,295, 3,224,782 and 3,883,146).

The sound carriers used together with the sound reproducing apparatuses referred to herein, have a playing time of approximately 1 to 4 minutes. The diameter of the outer sound groove is approximately 2 to 4 centimeters.

Especially for sound carriers used in language teaching, it is often desired to repeat the text which is pronounced to the user on the sound carrier not entirely, but only a specific part thereof.

However, these known sound reproducing apparatuses for these small non-rotating sound carriers do not allow for a selection of the text. It is not possible to listen only to the middle or any other part of the text without playing back also the preceding text which it is not desired to listen to. That is so because the pickup cannot be shifted manually as it is possible to do with most conventional record players in which the tone arm can be led by hand to a certain groove or to a position inbetween portions of the sound groove which are separated from each other, mostly by blank grooves. In long-playing records with several music pieces recorded, the portions are usually separated from each other through the provision, in the basically continuous sound groove, of some blank grooves of notably greater pitch than is normal, so that this intermediate zone would be recognizable, the pickup would be able to be set thereon, and also that said zone would be rapidly passed through when playing back.

The fact that the initially described sound reproducing apparatus would not permit selecting a text, accounts for a decrease in value of sound reproducing apparatuses and small, non-rotating sound carriers of the kind referred to when they are used for teaching purposes, particularly in teaching languages.

SUMMARY OF THE INVENTION AND OBJECTS

It is an object of the invention to further develop a sound reproducing system including the initially described detachable sound reproducing apparatus with pertaining non-rotating sound carrier in such a way that easy access may be had also to portions lying between lead-in and lead-out grooves or between starting and ending sides of the playing zone of the sound carrier sound groove. It is a further object of the invention to provide a sound reproducing apparatus which is of simple structure and reliable and which can be manufactured at only slightly increased cost.

The invention provides a sound reproducing apparatus capable of being detachably put into place on the sound carrier, the apparatus including a rotating, vertical-axis tone arm table operable by a battery driven backed driving motor and accommodating a pickup system (tone arm with pickup system) which is supported to swivel that is journaled to pivot, in horizontal and vertical directions and is set on the sound carrier in the sound groove thereof through a lowering device out of a withdrawn position, when switching on the apparatus. That is, the pickup is adapted to be lowered onto the sound carrier by means of a lowering device out of a retracted position, when switching on the apparatus. The invention achieves its object in that an abutment cam is provided which is capable of being moved, i.e. swivelled into the area of movement of the pickup and engaged therewith. Said abutment cam can be moved into different radial positions, with respect to the tone arm table axis, through a setting or control member adjustable from the outside of the housing of the sound reproducing apparatus. The revolving pickup first moves into contact with said abutment cam and is then urged inwardly towards the tip thereof over which it will slidingly pass when reaching the desired radial portion of the sound groove.

Conveniently, a step-down gear unit is provided between said setting member and said swivelling abutment cam in order to attain the desired (radial) position in the sound groove with the highest possible accuracy. The setting member is particularly easy to adjust when it is formed as a turning knob. It is then advantageous if said setting member or said step-down gear unit cooperates with a catch, especially a notched disc, said disc defining reproducible angular positions of the abutment cam. In case the setting knob cooperates with a scale having indicia corresponding to the notches, it is easy to obtain a reproducible combination with the radial position of the releasing tip of said abutment cam, such that the sound-illustrated text may already point out settings for approaching certain portions of the sound carrier directly.

With the abutment cam (pickup lead cam) swivelled, and once the sound reproducing apparatus has been turned on, the pickup system, or the stylus thereof, cannot be set on the outer region of the spiral-shaped sound groove, but, in case of sound grooves scanned from the outside inwardly, it is first urged towards a radially further inner position before it is released for playback. The pickup is released for playback if and when it is able to scan the sound grooves under no control from said abutment cam. It is conceivable that the pickup system is already in the lowered position on the sound carrier within the region of the lead-in groove and only then engages with the abutment cam. The latter urges it relatively rapidly radially inwardly and, in doing so, leads it across the outer sound grooves. In consideration of the small mass of the pickup, this will cause no prejudice, especially not to sound grooves of small diameter. In order to avoid scratchy noise, the reproducing amplifier may first be automatically muted for a short period of time. The process of swivelling the tone arm inwardly onto the desired sound groove generally lasts less than 1 second, and for this reason, muting needs being only of correspondingly short duration. The abutment cam may be swivelling directly into the area of movement of the pickup system, and the latter may come directly into contact with said abutment cam. This type of embodiment is possible when the pickup system is cylindrical, for example, and if a stop can be arranged above the stylus. If such arrangement is not desirable or impossible to achieve, said abutment cam may be swivelling into the area of movement of a stop member on the tone arm, said stop member engaging with said abutment cam directly. Such a stop member may be in the form of a pin, disposed besides the pickup system, or a nose integrally formed with the tone arm. If it is desired that the stylus of the pickup system does not scrape across the first sound grooves before it reaches the desired sound groove portion, the stylus must be maintained lifted off the sound carrier during shifting of the tone arm towards the desired sound groove portion. This can be achieved in an easy manner if the engaging edge of said abutment cam has an upwardly inclined chamfer, and if the pickup system or the stop member of the tone arm climbs said inclined surface so as to lift the pickup off the sound carrier. The stylus needs to be lifted off only a fraction of a millimeter. In order to facilitate the lift-off, not only can said engaging edge of the abutment cam be chamfered, but also the engaging surface of the pickup system or of the stop member of the tone arm may have a chamfer in the same direction.

The abutment cam may be swivelling into the area of movement of the pickup below the tone arm table, i.e. between the latter and the sound carrier, or above the tone arm table, depending on where the abutment cam can be best accommodated, from a design point of view, within the housing of the sound reproducing apparatus and where a good cooperation is possible with the pickup. Thus, for example, the stop member of the tone arm may be uprising from the top of the tone arm table, or the abutment cam comes into contact directly with the housing of the pick-up system underneath the tone arm table and thus urges it towards the desired portion of the sound groove.

In principle, it is not necessary that the spiral-shaped sound groove of the sound carrier be divided into several portions through the shape of the sound groove. However, particular advantage can be obtained from a sound carrier having a spiral-shaped sound groove in which the latter is radially subdivided into a plurality of sound zones, between which the sound groove has a larger pitch than within the sound zones themselves. The intermediate sound groove portion having the larger pitch may be comprised by two blank grooves, such as is known per se from long-playing recording discs recording a plurality of pieces. Sufficiently accurate approach of the blank grooves using the abutment cams is easy, so that the playback process will be started exactly at the desired portion of the sound groove.

In sound reproducing apparatus in which the pickup process proceedes from the center outwardly, the abutment cam is installed in the housing of the sound reproducing apparatus in such a way that the tone arm is moved positively from the center outwardly toward the desired text passage.

BRIEF DESCRIPTION OF THE DRAWINGS

The foregoing and other objects of the invention will be readily evident from the following detailed description of a preferred embodiment with reference to the accompanying drawing in which.

DESCRIPTION OF PREFERRED EMBODIMENT

Figure 1:
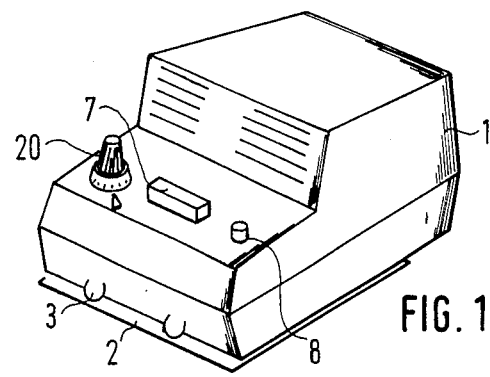
FIG. 1 shows a perspective view of a sound reproducing apparatus.
Figure 2:
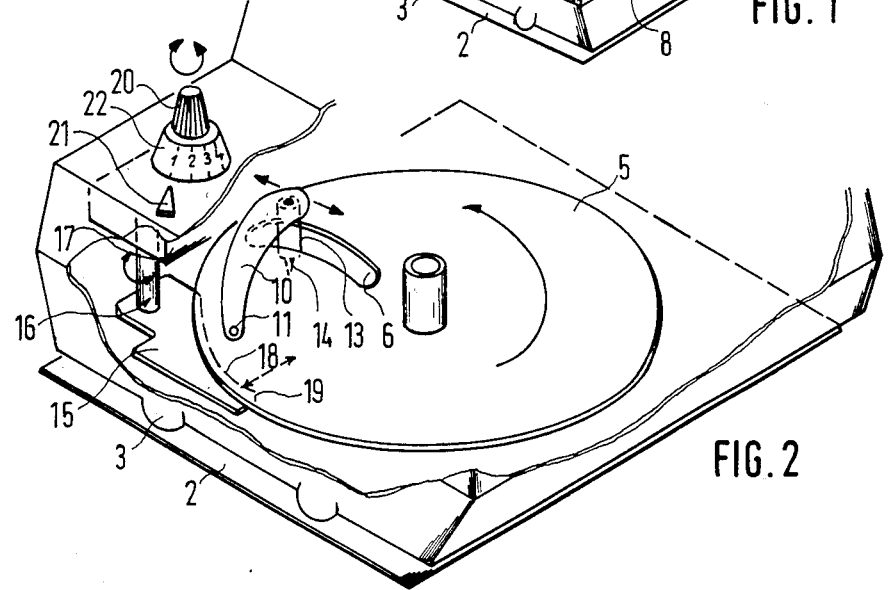
FIG. 2 shows a perspective partial view of that part of the sound reproducing apparatus in which the abutment cam with the setting member is accommodated, the cam being shown in an inoperative outer position, and FIG. 3 a perspective view, similar to that of FIG. 2, but illustrating the condition after the abutment cam has engaged with the pickup system.
Figure 3:
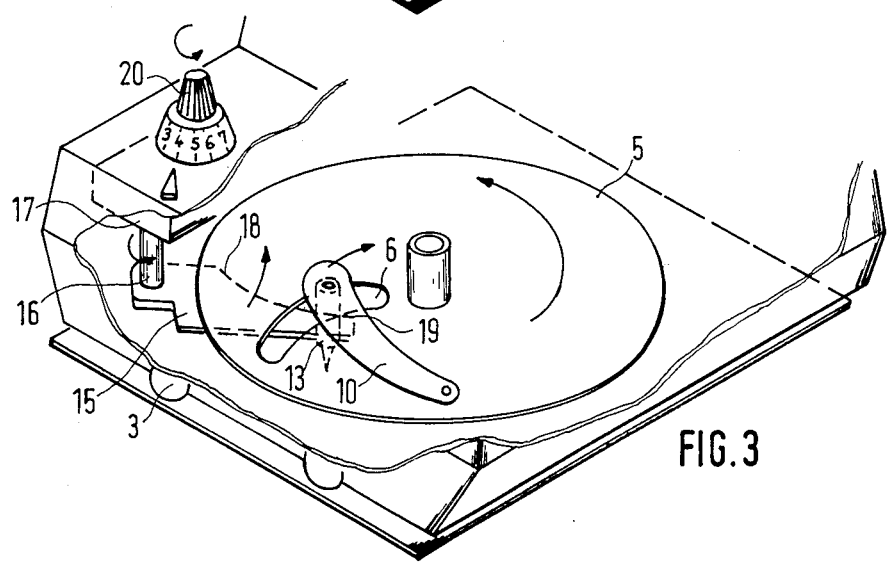

As shown in FIG. 1, the sound reproducing apparatus 1, which is placed on top of a sound carrier 2, may be of a type as disclosed, for example, in German patent No. 24 30 377. At its front end, the housing is formed with two feet 3 which serve as aligning means for location in correct positional relationship on top of the sound carrier 2, the latter being provided with matching aligning holes. Within said housing, a battery backed tone arm table 5, as shown in FIGS. 2 and 3, its driving unit as well as an amplifier with loudspeaker for sound reproduction are installed. Above the aligning feet 3, and within the housing, a switching-on pushbutton 7 and, at the right thereof, a stop pushbutton 8 are arranged.

In the outer region of the top surface of tone arm table 5 a tone arm 10 is mounted in a support 11 to swivel in radial and vertical directions. At its front end, it accommodates a pickup system 13 which extends through an arcuate slot 6 formed in said tone arm table, and from the underside of which a stylus 14 is protruding to engage with a (not shown) spiral-shaped sound groove of sound carrier 2. Tone arm table 5 rotates about a vertical rotational axis.

At the beginning of a playback operation, in order to urge pick-up system 13 or tone arm 10, respectively, radially inwardly to set to a desired portion of the sound groove, an abutment cam 15 is pivotably supported, by a shaft 16, in the housing of the sound reproducing apparatus, below tone arm table 5, Said shaft depends downwardly from a step-down gear unit 17, affixed below the housing top wall. Turning of the rotational axis 16 is done through a setting knob 20 which protrudes from the top wall and is capable of turning into a plurality of angular positions defined by a notched disc, not shown in details, in order to obtain same in a reproducible manner. Further, a pointer 21 is provided on the housing top surface which may coincide with corresponding indicia 22 on setting knob 20. Turning setting knob 20 causes abutment cam 15 to move out of the initial position shown in FIG. 2 to the operative position as shown in FIG. 3. The further adjusting knob 20 is turned, the further will the abutment cam be moved into the area of movement of the pickup including tone arm 10 and pickup system 13.

The abutment cam is of a flat configuration and shows an arcuate inner engaging edge 18 opposite the rotational axis of tone arm table 5, said engaging edge engaging with pickup system 13 directly. As can be seen from FIG. 3, pickup system 13 moves along engaging edge 18 outwardly until it reaches tip 19 thereof where it leaves the abutment cam and can then freely scan the sound groove. Upon one complete rotation of the tone arm table, pickup system 13 will have been led inwardly by the sound groove to a point where no contact with the abutment cam can take place any more. Then, the pickup system will scan the sound groove up to the inner lead-out groove.

The shifting mechanism for abutment cam 15 can be so arranged that said cam is displaced linearly or along a curve in order to reach the area of movement of the pickup. It is also possible for abutment cam 15 to be arranged above tone arm table 5 and to engage with a stop member provided on tone arm 10.

The disclosed sound reproducing apparatus permits the reproduction of individual sound segments or sound zones of the sound carrier without having to listen to preceding sound zones. Once the desired sound segment has been played back, the apparatus can be switched off forthwith, so that the sound zones following the desired sound segment need not be played either.

In the marginal portion of the sound carrier, one could provide, by engraving, two, three or more numbers indicative of the subdivision of the sound groove so that reproduction can be started always in the correct position. Conveniently, such numbers would be shown also in the text of the printed matter which the sound carrier is assigned to, and this at the beginning of the respective paragraph. It is possible to subdivide a sound carrier having a playing time of 4 minutes, into approximately 10 sound zones, it being of no importance whether the length of one sound zone is 40 seconds and that of the next one 120 seconds.

What is claimed is:

1. An electrically driven sound reproducing apparatus for non-rotating sound carriers having a spiral-shaped sound groove, including aligning means permitting the sound reproducing apparatus to be put into place in correct positional relationship with respect to a sound carrier, said apparatus having a housing including a rotatable, vertical-axis tone arm table operable by a battery driven driving motor, a pickup system journaled on said table to pivot in horizontal and vertical directions, a lowering device for lowering said pickup system onto the sound carrier from a retracted position into an operational position, switch means for switching on the apparatus, an abutment cam having an arcuate engaging surface and a tip at one end thereof for movement into a position such that said pickup system moves into engagement with said abutment cam adjacent said engaging surface and which can be moved into one of several radial positions with respect to the tone arm table axis, and a control member adjustable from outside the housing of the sound reproducing apparatus for moving the adjustment cam into one of the said positions, whereby said pickup system first moves into contact with said engaging surface of said abutment cam and is urged inwardly therealong towards the tip over which it will slidingly pass when reaching a desired radial portion of said sound groove.

2. The sound reproducing apparatus of claim 1, wherein a step-down gear unit is provided between said control member and said abutment cam.

3. The sound reproducing apparatus of claim 1, wherein said control member is formed as a turning knob.

4. The sound reproducing apparatus according to claim 1, wherein said abutment cam can be moved adjacent a stop member projecting from the tone arm, and said stop member engages with said abutment cam directly.

5. The sound reproducing apparatus of claim 1 or 4, wherein the engaging edge of said abutment cam has an upwardly inclined chamfer, and said pickup system or said stop member of the tone arm climbs said inclined surface so as to lift the pickup off said sound carrier.

6. The sound reproducing apparatus according to claims 1 or 2, wherein said setting member or said step-down gear unit cooperates with a catch which defines reproducible angular positions of said abutment cam.

* * * * *